US012598337B2

(12) United States Patent　　　　(10) Patent No.:　US 12,598,337 B2
Tang et al.　　　　　　　　　　　　(45) Date of Patent:　Apr. 7, 2026

(54) DYNAMIC AIRPLANE VIDEO-ON-DEMAND BANDWIDTH MANAGEMENT

(71) Applicant: Panasonic Avionics Corporation, Irvine, CA (US)

(72) Inventors: Min-Hsuan Tang, Mission Viejo, CA (US); Shankar Shastry, Irvine, CA (US); Carol Hsieh, Irvine, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 238 days.

(21) Appl. No.: 18/591,406

(22) Filed: Feb. 29, 2024

(65) Prior Publication Data

US 2025/0280160 A1　　Sep. 4, 2025

(51) Int. Cl.
| | |
|---|---|
| *H04N 21/2343* | (2011.01) |
| *H04N 21/214* | (2011.01) |
| *H04N 21/2187* | (2011.01) |
| *H04N 21/2543* | (2011.01) |
| *H04N 21/258* | (2011.01) |
| *H04N 21/45* | (2011.01) |
| *H04N 21/472* | (2011.01) |

(52) U.S. Cl.
CPC ..... *H04N 21/2343* (2013.01); *H04N 21/2146* (2013.01); *H04N 21/2187* (2013.01); *H04N 21/25435* (2013.01); *H04N 21/25866* (2013.01); *H04N 21/4532* (2013.01); *H04N 21/472* (2013.01)

(58) Field of Classification Search
None
See application file for complete search history.

(56) References Cited

U.S. PATENT DOCUMENTS

| | | | | |
|---|---|---|---|---|
| 2003/0233658 | A1* | 12/2003 | Keen ...................... | H04N 7/106 |
| | | | | 348/E7.071 |
| 2012/0297417 | A1* | 11/2012 | Philpott ........... | H04N 21/41407 |
| | | | | 725/34 |
| 2014/0355625 | A1* | 12/2014 | Chen ..................... | H04L 65/756 |
| | | | | 370/468 |
| 2015/0215738 | A1* | 7/2015 | Frusina ................. | H04W 76/15 |
| | | | | 455/552.1 |
| 2016/0337426 | A1* | 11/2016 | Shribman ............. | H04L 65/612 |
| 2017/0201761 | A1* | 7/2017 | Walker ............. | H04N 21/43074 |
| 2018/0035140 | A1* | 2/2018 | Li ...................... | H04N 21/2662 |
| 2018/0063213 | A1* | 3/2018 | Bevilacqua-Linn ........................ |
| | | | | H04L 67/303 |
| 2019/0081998 | A1* | 3/2019 | Reznik ............... | H04N 21/2401 |
| 2020/0037046 | A1* | 1/2020 | Hardin ........... | H04N 21/440218 |
| 2020/0076865 | A1* | 3/2020 | Navali ................. | H04N 21/845 |
| 2020/0252312 | A1* | 8/2020 | Harb .................. | H04N 21/8456 |
| 2025/0274499 | A1* | 8/2025 | Power ............... | H04N 21/4263 |

FOREIGN PATENT DOCUMENTS

WO　　WO-2008029040 A2 *　3/2008　............. H04W 4/42

* cited by examiner

*Primary Examiner* — Mohammed Jebari
(74) *Attorney, Agent, or Firm* — Perkins Coie LLP

(57)　　　　　ABSTRACT

Methods, apparatus and system for managing an in-flight entertainment network include a method in which a first manifest file and a second manifest file are received. A first data connectivity with a first group of display devices and a second data connectivity with a second group of display devices is established. A bandwidth map and a profile map are used based on the manifest files and used for providing entertainment to the first group of display devices and the second group of display devices.

20 Claims, 6 Drawing Sheets

_/ 500 receiving a first manifest file indicative of a bandwidth map of a wired in-flight digital communication network in an airplane and a capability map of display devices coupled to the wired in-flight digital communication network 〜 502 receiving a second manifest file indicative of a profile map of users in the airplane 〜 504 establishing data connectivity between a first group of display devices and a media data server in the airplane according to the bandwidth map and the profile map, wherein the first group of display devices are provided media at a first display resolution 〜 506 establishing data connectivity between a second group of display devices and the media data server in the airplane according to the bandwidth map and the profile map, wherein the second group of display devices are provided media data at a second display resolution different than the first resolution 〜 508

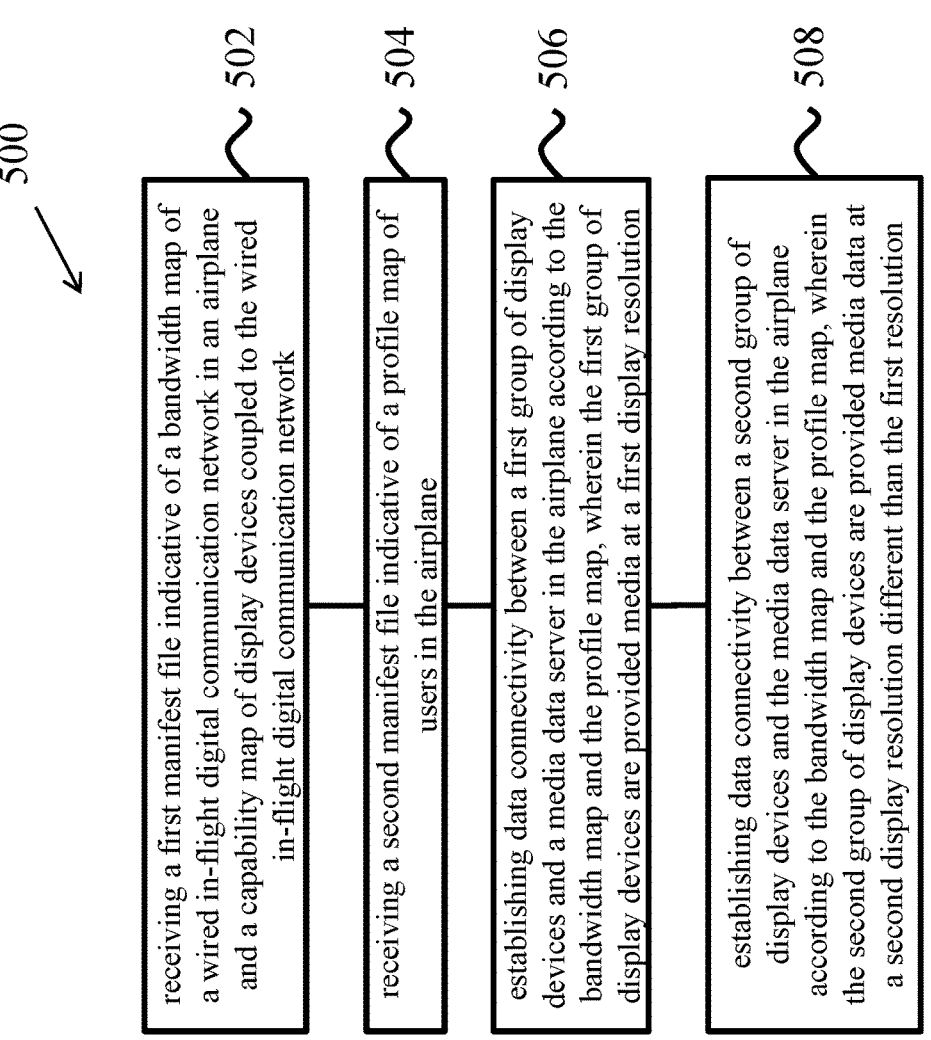

500 receiving a first manifest file indicative of a bandwidth map of a wired in-flight digital communication network in an airplane and a capability map of display devices coupled to the wired in-flight digital communication network

502 receiving a second manifest file indicative of a profile map of users in the airplane

504 establishing data connectivity between a first group of display devices and a media data server in the airplane according to the bandwidth map and the profile map, wherein the first group of display devices are provided media at a first display resolution

506 establishing data connectivity between a second group of display devices and the media data server in the airplane according to the bandwidth map and the profile map, wherein the second group of display devices are provided media data at a second display resolution different than the first resolution

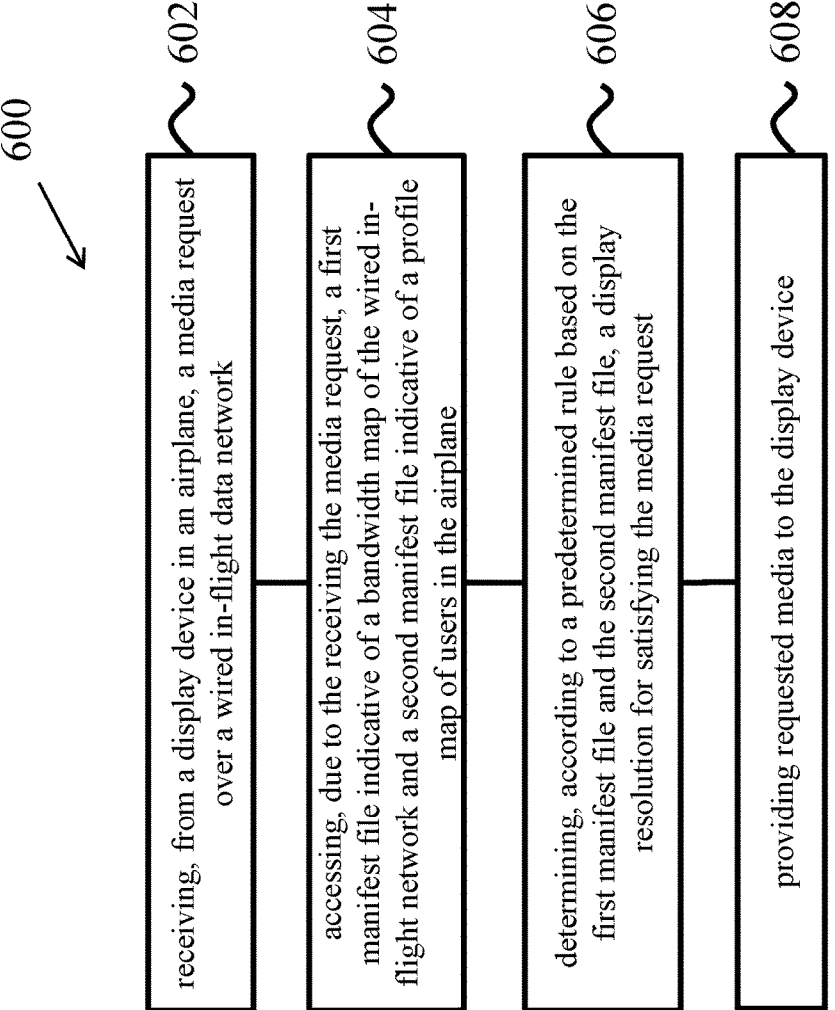

600 receiving, from a display device in an airplane, a media request over a wired in-flight data network
602 accessing, due to the receiving the media request, a first manifest file indicative of a bandwidth map of the wired in-flight network and a second manifest file indicative of a profile map of users in the airplane
604 determining, according to a predetermined rule based on the first manifest file and the second manifest file, a display resolution for satisfying the media request
606 providing requested media to the display device
608

FIG. 6

DYNAMIC AIRPLANE VIDEO-ON-DEMAND BANDWIDTH MANAGEMENT

TECHNICAL FIELD

The present document relates to in-flight entertainment systems.

BACKGROUND

Commercial travel has evolved to provide an informative and interactive experience to passengers traveling to their destinations. Via in-vehicle systems, entertainment options and useful information can be curated and presented to passengers via monitors located on the back of airplane seats or train seats, for example. As an alternative to monitors installed within the vehicle, passengers commonly own and use user (passenger) devices that are capable of presenting content to the passengers.

SUMMARY

The present document provides various techniques that may be used to provide video-on-demand services to passengers in an airplane.

In one example aspect, a method of managing an in-flight digital communication network is disclosed. The method includes receiving a first manifest file indicative of a bandwidth map of a wired in-flight digital communication network in an airplane and a capability map of display devices coupled to the wired in-flight digital communication network, receiving a second manifest file indicative of a profile map of passengers in the airplane, establishing data connectivity between a first group of display devices and a media data server in the airplane according to the bandwidth map and the profile map, wherein the first group of display devices are provided media at a first display resolution, establishing data connectivity between a second group of display devices and the media data server in the airplane according to the bandwidth map and the profile map, wherein the second group of display devices are provided media data at a second display resolution different than the first display resolution, and wherein the first display resolution and the second display resolution are a function of the bandwidth map, the profile map, a current number of devices in the first group of display devices and a current number of devices in the second group of display devices.

In another example aspect, a method of processing media requests is disclosed. The method includes receiving, from a display device in an airplane, a media request over a wired in-flight data network, accessing, due to the receiving the media request, a first manifest file indicative of a bandwidth map of the wired in-flight network and a second manifest file indicative of a profile map of passengers in the airplane, determining, according to a predetermined rule based on the first manifest file and the second manifest file, a display resolution for satisfying the media request, and providing requested media to the display device.

In yet another aspect, a controller configured to operate to control an in-flight entertainment network is disclosed. The controller includes at least one processor configured to implement the above-described methods.

In yet another aspect, a computer readable medium is disclosed. The computer readable medium stores processor-executable program code that, upon execution by one or more processors, causes implementation of one or more methods described in the present document.

These, and other aspects are disclosed throughout the present document.

BRIEF DESCRIPTION OF THE DRAWINGS

FIG. 5 is a flowchart for an example method of controlling an IFEC operation.

FIG. 6 is a flowchart for an example method of providing VOD to passengers through an IFEC.

DETAILED DESCRIPTION

Figure 1:
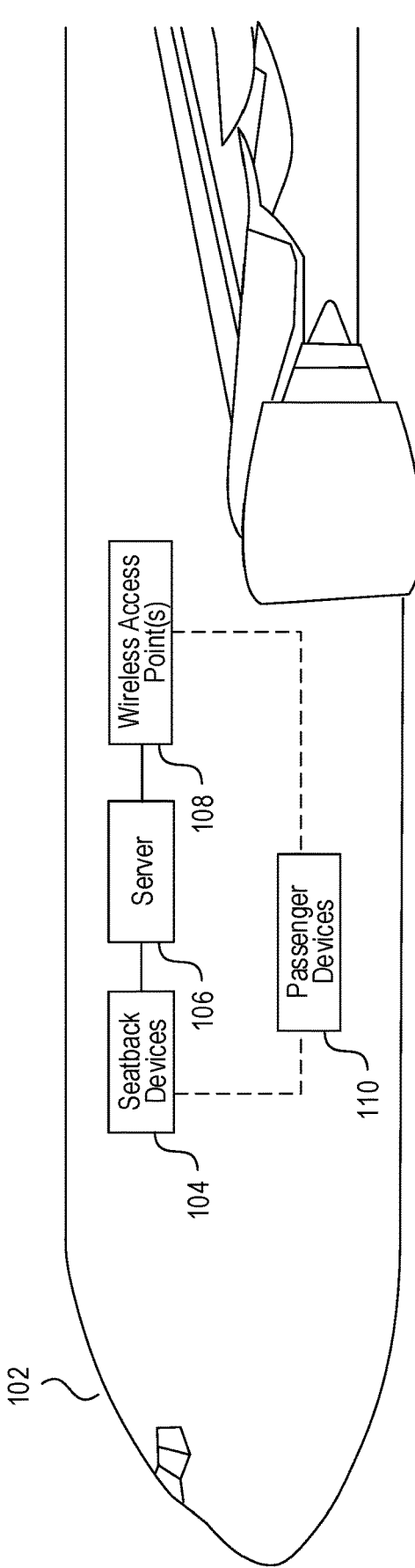
FIG. 1 shows an exemplary passenger vehicle that includes an in-flight entertainment and communication (IFEC) installation, in accordance with embodiments described herein.

Among the many advancements in travel technology and aircraft technology, improvements in passenger experience have received much attention. Air travel typically involves journeys over extended distances that often take several hours to complete, so airlines provide onboard in-flight entertainment (IFE) and communications (IFEC) systems that offer a wide variety of multimedia content for passenger consumption. For example, IFEC systems may offer recently released movies and television shows such as news programs, situation and stand-up comedies, documentaries, and so on for passenger viewing. As another example, IFEC systems may offer audio-only programming, video-only content, video games, or the like. As yet another example, the multimedia content provided to passengers includes flight maps, passenger account information, flight itinerary information, flight tracking information, and/or other useful and/or passenger-specific information.

Typical commercial passenger vehicles include installations, monitors, stations, and/or the like within the vehicle that presents such content to passengers. For example, in many airplanes, each passenger seat is equipped with a seatback device that includes a display device, an audio output modality, an input modality, and a terminal unit (although the specific installation may vary depending on service class, in specific embodiments). The terminal unit may generate video and audio signals, receive inputs from the input modality, and execute pre-programmed instructions in response thereto. The display device may be a liquid crystal display (LCD) screen that is installed on the seatback of the row in front of the passenger, though in some cases it may be mounted to a bulkhead or retractable arm, or the like, that is in turn mounted to the passenger's seat. In some examples, the audio output modality is a headphone jack, to which a headphone, either supplied by the airline or by the passenger, may be connected. In some examples, the audio output modality enables wireless connection with passenger devices, such as personal audio playback devices (e.g., headphones, earphones, earbuds, speakers, etc.). Inputs to the terminal unit may be provided via a separate multi-function remote controller or by via a combination touch display. Although the terminal unit and display device were separate components in earlier IFEC implementations, more recently, these components and more may be integrated into a single smart monitor or seatback device. Thus, the vehicle is integrated with a plurality of monitors that present content to passengers.

Passengers of a vehicle commonly own and use personal electronic devices (also referred to herein as user devices or passenger devices) that are used by the passengers to consume content and information, whether within the vehicle travel context or otherwise. For example, passengers bring aboard personal devices, such as laptops, mobile phones, and tablets, for use during travel. According to advancements in vehicle technology, personal electronic devices of passengers are leveraged when presenting content and information to passengers within a vehicle. Individual seatback devices are configured with wireless connection capabilities for wirelessly connecting with personal electronic devices of passengers, such that the content and information is relayed to and presented at the personal electronic devices.

1. Initial Discussion about Airplane Video on Demand (A VOD)

Traditional in-flight entertainment (IFE) systems consist of an onboard media server line replaceable unit (LRU) that streams media content to the passenger seatback displays. Such a system is limited in the resolution of media content it can support based on several factors: [1] the video compression and encoding standard (e.g. MPEG-4, H.265), [2] streaming capacity of the media server (e.g. CPU power, RAM size), and [3] the capacity of the network it resides on (e.g. 100Base-T, 1000Base-T, 2.5G, 5G, 10G, wireless bandwidth, etc.) including any intermediate LRU's between the media server and the seatback displays such as Area Distribution Boxes (ADB) or Floor Disconnect Boxes (FDB) that may create unintended network bottlenecks.

Newer IFE systems have evolved to utilize a more seat-centric architecture where the seatback display acts as a media server and decodes/plays video content from its internal solid-state disk (SSD), as well as streams media to other nearby displays. This architecture takes the streaming capacity burden off the media server LRU and places it into the seatback display. This method has been referred to as "virtual local storage" and allows multiple seats to combine their individual internal SSD's to form a larger pool of storage for media content that is then made accessible to a group of seatback displays.

These systems each improve on the shortcomings of its predecessor, but the underlying problem remains, namely, the highest resolution of media content that the seatback display can play may not supported by the system because the system itself (e.g. the media server LRU and the ethernet network) cannot handle the total bandwidth needed for all seats to simultaneously stream the highest resolution of video encoding. Also, a seat centric model requires solid-state storage drives in every seatback display which drives up the total cost of the IFE system.

2. Example A VOD Techniques

To solve the above-described technical problem, and others, the present document offers techniques that provide a simple way for the media server LRU to intelligently manage its A VOD streaming bandwidth capacity, while allowing the airline to offer a range of different video resolutions from low to high and eliminates costly solid-state drives in every seatback display. For example, the media server may store a pre-configured total A VOD streaming bandwidth capacity, which can reside in a configuration database (e.g. SQL database) set by a human user based on bandwidth values obtained from lab testing. An example of a tested bandwidth capacity for a particular media server LRU could be 6000 Mbps. A controller in the media server may perform the operations further as described herein.

The configuration database will maintain a list of all the potential VOD clients that are present in that onboard IFE system including the quantity of passenger seatback displays, crew seatback displays, and Crew Terminals, as well as the different resolutions and video decoding/decompression capabilities of those displays.

The media server will be pre-loaded with multiple resolutions of each video title, i.e. the movie Iron Man may be available in four different video resolutions: 480p (2 Mbps bit rate), 720p (5 Mbps bit rate), 1080p (8 Mbps), and 4K (20 Mbps). The media server software will dynamically choose which resolution of video to stream depending on the capability of the seatback display and the bandwidth availability of the media server's remaining resources as well as the network's available capacity.

When a passenger browses the video library and chooses to play a movie (e.g., Iron Man), the seatback display will send a request to the media server and the server will determine that this passenger's seatback display can support 4K display and there is enough bandwidth capacity available to stream 20 Mbps to this seatback.

As the number of requests increases, the media server software will dynamically determine whether to send the video stream in a lower resolution in order to reduce the bandwidth required.

In some embodiments, the controller will predetermine a threshold for the number of 4K video streams it will allow, and separate threshold numbers for 1080p, 720p and 480p respectively, as well as a threshold for wireless VOD (assume only 480p resolution). The system will try to maximize the threshold of the highest resolution of video based on the media server's capability, the network capacity, and the number of seatback displays in the cabin.

For example, if the controller sets the threshold to 200× 4K streams, 100× 1080p streams, 50× 720p streams, 25× 480p streams, and 25× wireless 480p streams, then the first 200 seatback displays that request a video stream will receive a 4K video stream (assuming that video title is available in 4K resolution and the seatback display is capable of displaying 4K). Then the 201st to 300th seatback displays requesting video titles will receive 1080p video streams with similar assumptions. And so on and so forth for 720p, 480p resolution videos as well as the wireless 480p resolution videos.

This approach of first-come-first-served allows the system to support high resolution video for a limited number of displays while still being able to support full cabin A VOD streaming.

Upon each video stream viewing session ending, the media server will keep track of this and readjust to allow the next video stream request (or a current stream) to be the highest video resolution possible.

It is commonplace now for the seatback displays to have the capability to upscale low-resolution video to display in the monitor's native resolution which could be much higher. For smaller monitors such as 10-13", which is typical for economy class seats, the upscaling technology is good enough where the passenger will likely be unable to detect any difference in the quality of a video that was streamed in 4K, 1080p, 720p, or even 480p.

For the premium class passengers that have larger displays ranging from 16" to 55" size where the streamed video resolution may be more obvious, we will pre-set the database to reserve a set number of 4K or 1080p video streams for these seats. This will give the higher paying seat classes the luxury of always receiving a higher resolution video to ensure the best possible video quality is displayed.

3. Example IFEC Platform

FIG. 1 shows an exemplary overview of an IFE system installed in an airplane 102, and example embodiments in which the disclosed A VOD management may be performed for the IFE system and the airplane 102. The IFE system includes a plurality of seatback devices 104, and the seatback devices 104 are located at locations within the vehicle. For example, the seatback devices 104 are located at each seat of the airplane 102, which are laid out in a fixed grid or layout of seat rows and seat columns. In some embodiments, the seatback devices 104 include an in-device terminal or computing unit (e.g., a display or a display device). In some embodiments, the seatback devices 104 are communicably coupled to computing units (e.g., computers) that may be located in a seat below one or more seatback devices 104. For example, one or more seatback devices 104 located in a row in the airplane 102 may be communicable coupled to one computing unit located below a seat in the row. In another example, each seatback device 104 may be communicably coupled to a respective computing unit that is located in the seat where the seatback device 104 is located.

In some embodiments, each of the plurality of seatback devices 104 is configured such that a passenger device 110 can directly connect with a seatback device 104 (or a computing unit to which the seatback device 104 is coupled). For example, each seatback device 104 is configured for Bluetooth or Bluetooth Low Energy (BLE) communication with passenger devices 110. Accordingly, a seatback device 104 is configured to detect nearby candidate passenger devices, receive connection requests from passenger devices 110, establish a direct connection or pairing with a passenger device 110, and transmit/receive data via the direct connection or pairing with the passenger device 110. In some examples, a seatback device 104 is configured for direct communication with passenger devices 110 via other means, such as a near-field communication (NFC) device via which a passenger device 110 directly communicates with the seatback device 104. As the seatback device 104 connects with a nearby passenger device 110, the in-vehicle location of the seatback device 104 approximately represents a location of the wireless connection.

Each of the plurality of seatback devices 104 (or computing units to which the seatback devices 104 are coupled) may include an ethernet connector which allows the plurality of seatback devices 104 to be communicably coupled to a server 106 via, for example, an Ethernet switch or another configuration described in the present document. In some embodiments, a seatback device 104 reports connection requests from passenger devices, connection and disconnection events, device information, video playback start, stop, pause requests, and/or the like to the server 106.

In some embodiments, the server 106 implements a connection management system and is configured to transmit instructions or commands to individual seatback devices that cause the individual seatback devices to continue or disconnect respective wireless connections. In performing example operations disclosed herein, the server 106 may include the controller that performs the VOD control functions described herein. In some embodiments, the wireless access points 108 may provide data connectivity to the passenger devices that may be used to control A VOD program running on the seatback device 104 to start, stop or pause an ongoing A VOD viewing session.

While FIG. 1 illustrates an example of an aircraft, embodiments disclosed herein for controlling wireless connections throughout various locations are applicable to other vehicles. For example, embodiments disclosed herein enable a system to be implemented on a train to control wireless connections between passenger devices and individual stations (e.g., seatback devices, tablets, kiosks) on the train. Further, embodiments disclosed herein are applicable to systems at travel hubs. For example, embodiments disclosed herein enable a system implemented at an airport lounge to determine whether to grant or deny wireless connections with a lounge device or system (e.g., a mounted screen, a television, a tablet, individual seat devices) by passenger or user devices.

Figure 2:
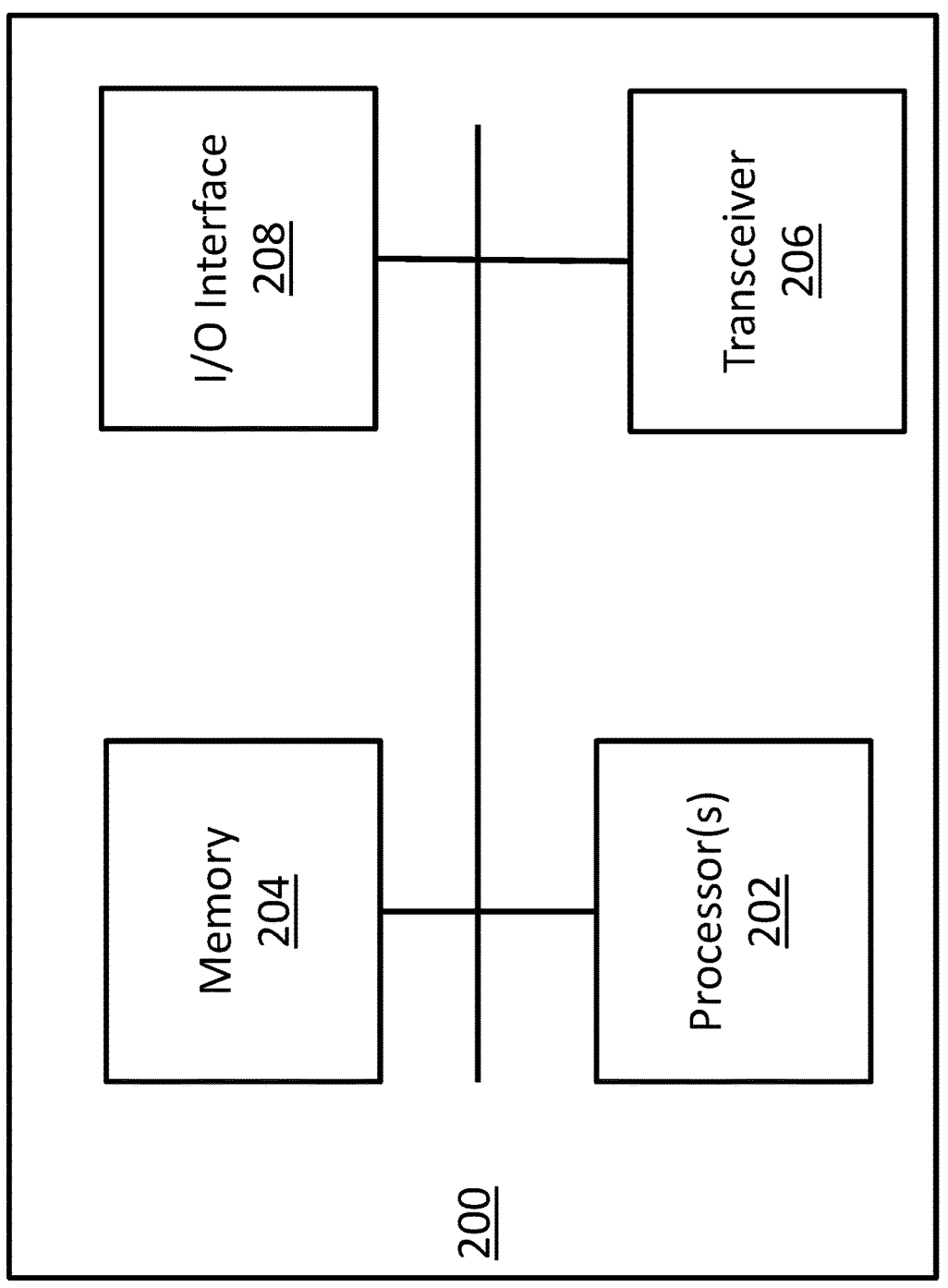
FIG. 2 is a block diagram of a hardware platform on which embodiments described herein may be implemented.

FIG. 2 provides a diagram illustrating an example computing entity 200 (a hardware platform) that implements various embodiments described herein, e.g., the media server or the controller. In some embodiments, the computing entity 200 is located within a vehicle. For example, in some embodiments, the computing entity 200 is configured to perform operations that start or stop VOD streaming. In some embodiments, the computing entity 200 is embodied by an entertainment system (in-flight entertainment and communication, or IFEC system), an in-vehicle server (e.g., server 106), a connection management system, and/or the like.

In FIG. 2, the computing entity 200 includes at least one processor 202 and a memory 204 having instructions stored thereupon. The memory 204 may store instructions to be executed by the processor 202. In other embodiments, additional, fewer, and/or different elements may be used to configure the computing entity 200. The memory 204 is an electronic holding place or storage for information or instructions so that the information or instructions can be accessed by the processor 202. The memory 204 can include, but is not limited to, any type of random access memory (RAM), any type of read only memory (ROM), any type of flash memory, etc. Such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 202 configure the computing entity 200 to perform the example operations described in this patent document.

The instructions executed by the processor 202 may be carried out by a special purpose computer, logic circuits, or hardware circuits. The processor 202 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 202 can perform the operations called for by that instruction. The processor 202 operably couples with the memory 204 and transceiver 206 to receive, to send, and to process information and to control the operations of the computing entity 200 (e.g., video data by a media server or instructions by a controller). The processor 202 may retrieve a set of instructions from a permanent memory device such as a ROM device and copy the instructions in an executable form to a temporary memory device that is generally some form of RAM. In some implementations, the computing entity 200 can include a plurality of processors that use the same or a different processing technology.

The transceiver 206 transmits and receives information or data to another device (e.g., a seatback device 104, a passenger device 110, a ground server, other servers, satellites, or the like). In some examples, the transceiver 206 transmits instructions that start/stop streaming or alter properties of video being streamed to a seatback device 104. In some examples, the transceiver 206 is configured to relay event information (e.g., describing a number of VOD streaming grants or denials, describing use of in-flight bandwidth, etc.) to a ground server that is used to refine and improve information used to define density zones. In some examples, the transceiver 206 is configured to receive manifest files from a ground server, from other aircraft, from satellites, and/or the like that includes parameters for starting/stopping or altering video streaming sessions by the computing entity 200. The transceiver 206 may be comprised of a transmitter and a receiver; in some embodiments, the computing entity 200 comprises a transmitter and a receiver that are separate from another but functionally form a transceiver.

In some embodiments, the computing entity 200 includes input/output (I/O) interfaces 208. The I/O interfaces 208 enable data to be provided to the computing entity 200 as input and enable the computing entity 200 to provide data as output. For example, the computing entity 200 may provide a user interface display to flight crew in an airplane via the I/O interfaces 208. As another example, the computing entity 200 provides a control display for the flight crew to view and/or modify the manifest files. In some embodiments, the I/O interfaces 208 may enable user input to be obtained and received by the computing entity 200 (e.g., via a touch-screen display, via buttons or switches) and may enable the computing entity 200 to display information. In some embodiments, devices including touch-screen displays, buttons, controllers, audio speakers, or the like are connected to the computing entity 200 via I/O interfaces 208. In some embodiments, the I/O interfaces 208 include a device interface via which the computing entity 200 communicates with seatback devices 104. The device interface enables the computing entity 200 to receive information from seatback devices 104 and to transmit instructions to specific seatback devices 104.

Figure 3:
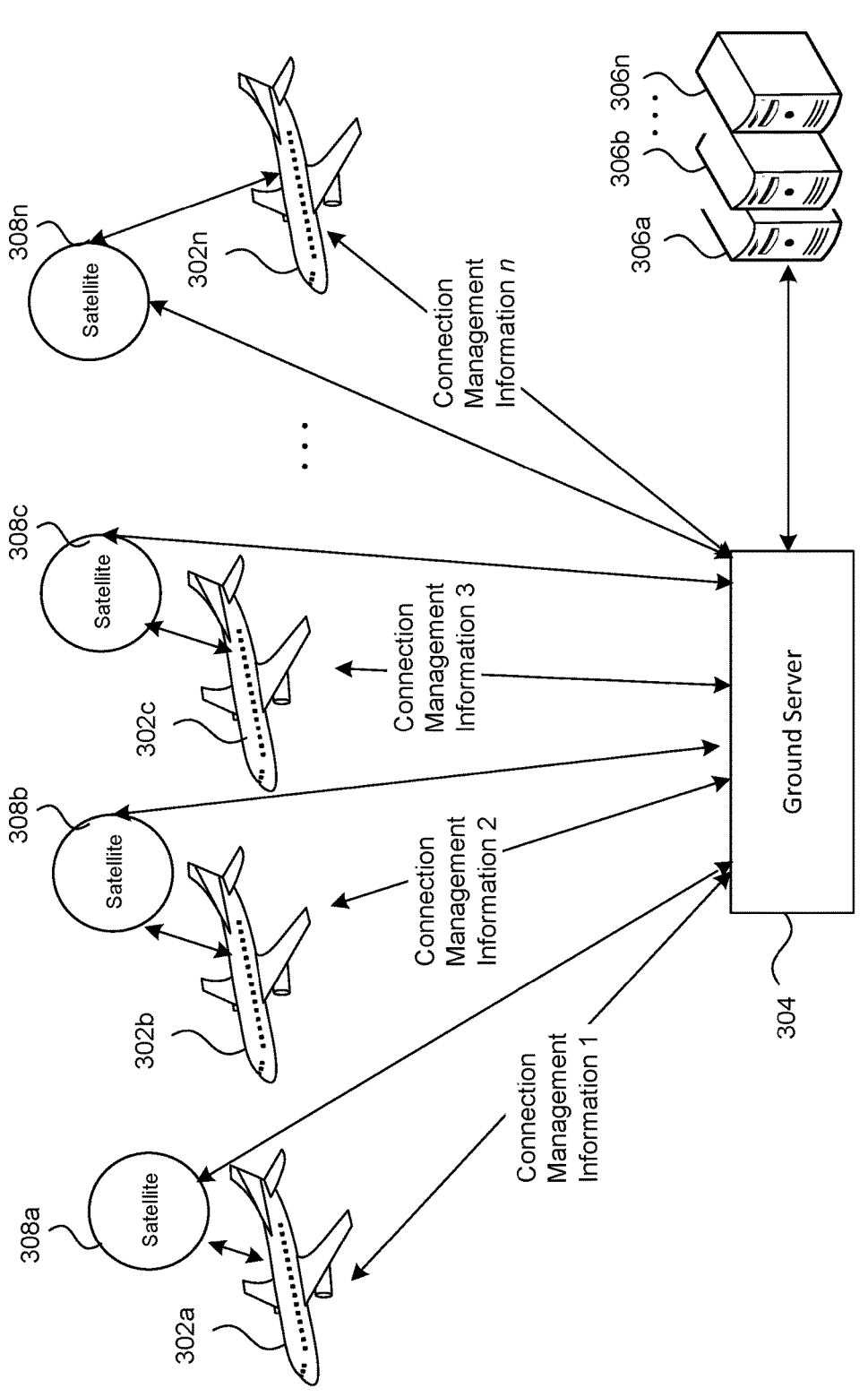
FIG. 3 shows a vehicle network with vehicles that implement technical solutions for managing video-on-demand (VOD) services.

FIG. 3 shows an exemplary system for data gathering, processing, and usage. The same system may also be used for communication of manifest files and/or other passenger information. In particular, FIG. 3 shows a communication network in which information obtained from and used for managing wireless connections in a vehicle is communicated to, from, and among vehicles and other systems. For example, in accordance with various embodiments described herein, a communication management system located on-board an airplane obtains information about airplane configuration and video bandwidth utilization.

A ground server 304 is configured to communicate with vehicles 302a, 302b, . . . 302n via a direct communication link or through a satellite connection using satellites 308a, 308b, 308c, . . . 308n, in some embodiments. In some embodiments, databases 306a, 306b, . . . 306n may include databases that store VOD information, databases that store event data, databases that store device location maps, and/or the like. In some embodiments, the ground server 304 communicates with each of the databases 306a, 306b, . . . 306n to provide one or more of the VOD information, event data, or seat map data to the vehicles 302a, 302b, . . . , 302n.

Figure 4:
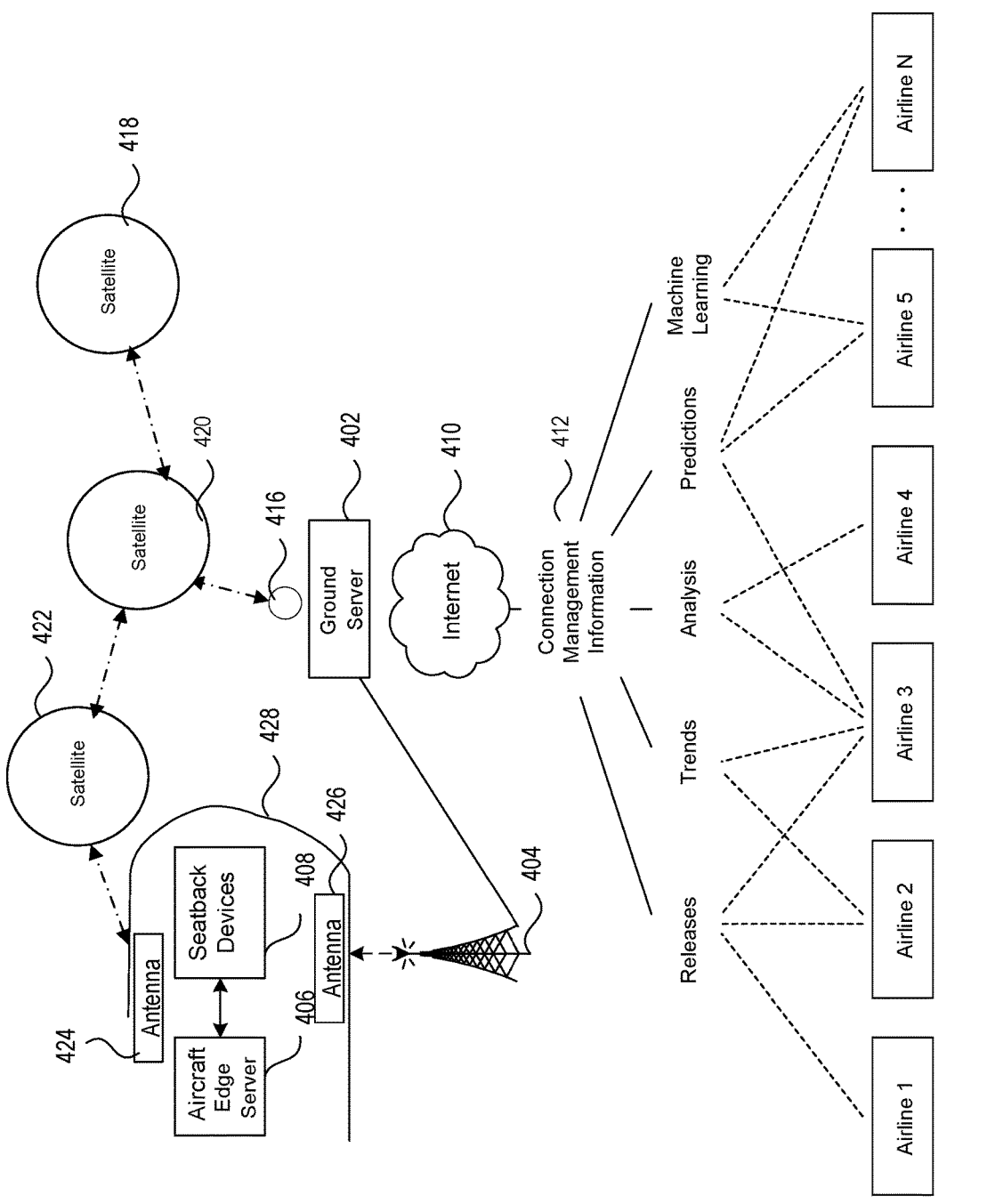
FIG. 4 shows an example system in which VOD may be provided across different airlines.

FIG. 4 shows another configuration of a system in which a ground server 402 may use information from multiple airlines (Airline 1, Airline 2. . . . Airline N) to provide VOD management information to an aircraft 428. For example, as illustrated, the ground server 402 communicates with multiple airlines to aggregate, analyze, and learn from event data collected by airlines to generate improved VOD configuration data. Thus, in some embodiments, improved VOD management configuration data is generated and stored at the ground server 402, possibly via communication through the internet 410, in some embodiments.

The ground server 402 may communicate the information via a satellite dish 416 with one or more satellites 418, 420, 422, and the information is in turn received in the aircraft 428 via antenna 424 by an onboard server 406, or edge server. The onboard server 406 may implement various embodiments described herein, to manage wireless connections between passenger devices and seatback devices 408 onboard the aircraft 428. Alternatively, or in addition, the ground server 402 may communicate the information to the onboard server 406 through a terrestrial connection such as through cellular communication via a cellular network to an antenna 426 onboard the airplane that is configured for cellular reception. In some embodiments, the connectivity between the ground server 402 and airplane equipment may be based on a local area wireless network (e.g., a Wi-Fi access point) or a cellular communication network (e.g., cell tower 404) which may be available to the aircraft 428 for communication while during a flight or when parked at an airport terminal, near the gate area.

As illustrated in FIG. 4, the onboard server 406 may be in communication with one or more seatback devices 408.

4. Example Embodiments

With reference to FIG. 5, in some embodiments, an in-flight entertainment and communication network (IFEC) may be controlled by a controller as follows (flowchart 500). The controller that performs the control operation may be located on the airplane, as described with reference to FIGS. 1 and 2.

At 502, the controller may receive a first manifest file. The first manifest file may include hardware-oriented data related to the VOD network in the airplane. In a typical use case, the first manifest file may not change for a long time (e.g., several months and until some hardware changes are made to the IFEC system).

In various embodiments, the first manifest file may be loaded to the controller prior to a particular travel segment. For example, the first manifest file may be provided to the controller when IFEC hardware is installed on an airplane. The first manifest file may be updated from time to time if hardware changes are made to the digital communications hardware such as ethernet cables, routers and so on. The first manifest file may include a bandwidth map. The bandwidth map may include information of bandwidth available to each passenger seat in the airplane.

The first manifest file may also include a capability map of each display device associated with a corresponding passenger seat. Here, the bandwidth map and the capability map may be logically implemented in a same manifest file, but practically may comprise two or more different computer files that are uploaded to the controller. The capability map may include one or more of the following information about a display: maximum horizontal resolution, maximum vertical resolution, optimal horizontal resolution, optima vertical resolution, different combinations of horizontal and vertical resolution combinational operation points, and so on.

At 504, the controller may further obtain a second manifest file that includes a profile map of users in the airplane. The profile map may be used to make a decision about the bitrate or the resolution at which a particular requested program will be sent to the passenger. The second manifest file may be generated prior at each travel segment, based on passengers that have made reservations or have actually boarded a flight. The second manifest file may include information indicating one or more passengers and a type of display resolution of quality of service of video that is associated with the passenger. For example, frequent flyers or passengers in premium class may be provided a guaranteed minimum display resolution video.

Based on the information received from the first manifest file and the second manifest file, the controller may establish, at 506, a first data connectivity between a first group of display devices and a media data server. Here, the media data may be provided to the first group at a first (same) display resolution. The grouping of the display devices may be performed upon them having similar entries in their display map.

At the same time, at 508, the controller may provide content to a second group of display devices based on a second resolution that is different from the first display resolution. For example, as mentioned in the present application, a same movie title may have been loaded in the media server at multiple resolutions. Initially, the controller may be configured to transmit one particular resolution to all displays in the first group and a second particular resolution to all displays in the second group. The grouping may be determined based on the combination of the first manifest file and the second manifest file. The second connectivity provided to the second group of display devices may differ from the first data connectivity at least in terms of display resolution (minimum, maximum or guaranteed), video quality (e.g., min, max or average bitrate), and so on.

In some embodiments, the display resolution of content provided to a particular passenger on a display associated with the passenger's seat are a function of the bandwidth map, the profile map, number of devices that are included in the first group and a number of devices in the second group of devices.

In some embodiments, the information related to the first data connectivity and/or the second data connectivity may be gathered in a log and the log may be periodically transmitted to the ground server. This will allow the ground server to orchestrate functions such as quality control, billing and seamless connectivity feature as disclosed herein.

In some embodiments, for a particular display device in either the first or the second group of devices, a passenger may be able to provide additional information such as passenger credential or payment to allow the passenger to override system settings regarding the display resolution for the group in which the passenger was originally classified. To enable this transaction, a user interface on the display device of the passenger may be provided.

In some embodiments, the above-disclosed methods may be implemented by an apparatus comprising at least one processor configured to read instructions stored in a memory (e.g., the controller of A VOD services, as disclosed herein).

In another example embodiment, the controller may implement a method 600 depicted in FIG. 6, for processing media requests.

The method 600 includes receiving (602), from a display device in an airplane, a media request over an in-flight data network. The media request may be received using an in-flight network or from a passenger device, e.g., as described with respect to FIG. 1.

The method 600 includes accessing (604), due to the receiving the media request, a first manifest file indicative of a bandwidth map of the wired in-flight network and a second manifest file indicative of a profile map of passengers in the airplane. Various features of the bandwidth map and manifest files are described throughout the present document, including Sections 4 to 7.

The method 600 includes determining (606), according to a predetermined rule based on the first manifest file and the second manifest file, a display resolution for satisfying the media request. Examples of how the display resolution is decided are provided throughout the present document, e.g., Section 8.

The method 600 includes providing (608) requested media to the display device according to the determining. For example, the predetermined rule may be used to decide the display resolution of the video that is provided to fulfill the request. In providing the requested media to the display device, the controller may alter ongoing media request fulfillment for at least one other display device. For example, display resolution or bitrate of the media being sent to the other display device may be adjusted downwards to make space for the media request of the display device.

In some embodiments, the controller may receive receiving a third manifest file indicative of passenger airport terminal or gate Wi-fi usage and levels of data connectivity between a passenger of the first group or the second group of the data media server of the airplane.

In some embodiments, wherein according to the first manifest file, the passenger is connected to a media to continue watching the media at an airport lounge at a level of the data connectivity prescribed by the first manifest file.

In some embodiments, the above-disclosed methods may be implemented by an apparatus comprising at least one processor configured to read instructions stored in a memory (e.g., the controller of A VOD services, as disclosed herein).

5. Examples of Bandwidth Maps

In some embodiments, bandwidth maps may provide information about bitrate capability of the transmission wiring from the media server to each display device in an airplane. In one example, the bandwidth map may list each display and maximum bandwidth available between the media server and the display. To generate this information, a determination may be made about cach hop through which the data communication between these two end points traverses, and the lowest common denominator is selected.

In another embodiment, the bandwidth map may be a matrix whose columns are cach IFEC seatback device and rows are cach IFEC seatback device. In this bandwidth map, the bandwidth available for transmission from one display device's storage to another display device may be made available.

In another embodiment, the bandwidth map may be described using hardware groupings of devices according to network hops. In airplane IFEC networking, data wiring may often be installed in a multi-hop manner. For example, multiple seatback displays in a seat row may share a same cable connection to a router for the row, with the router directly connected to the media server. Additional layers of such network hops may also be used. For such a case, a first layer bandwidth map may list all routers, displays and switches that are directly coupled to the media server in a non-blocking manner. Subsequently, a second layer bandwidth map may be listed for each of the first layer electronics with respect to a second layer connection to another number of devices, and so on.

6. Examples of Passenger Profile Information

As describe with reference to FIG. 6, the second manifest file may include passenger profile information. In some embodiments, the passenger profile information may include information about a passenger's perk status. For example, a premium cabin passenger or a frequent flyer status passenger may be identified by a higher tier perk status. For example, a passenger may have a previously established contract or payment that guarantees the passenger a minimum display resolution and/or video quality. In some embodiments, the passenger profile information may include travel information regarding the passenger such as the upcoming travel segment is a continuation of a previous travel segment. This information may be used to check whether a same display resolution should be provided to the passenger as his previous travel segment.

7. Examples of Display Capability Maps

In some embodiments, the first manifest file may provide a display capability map that allows the controller to identify locations of each display device and resolution handling ability of each display device. This information may be used in deciding which resolution of video should be chosen to fulfill a passenger request. This information may be collected by automatically polling a display upon installation. Alternatively, or in addition, this information may be uploaded or entered by a service person that installs a display device in an airplane. In various embodiments, the display capability information may include one or more of: supported display resolutions, preferred display resolution, display physical dimensions, codec formats supported by the display (e.g., H.264, H.265), and so on.

8. Connectivity Establishment Examples

Further to the embodiments disclosed with reference to FIG. 7, in some embodiments, upon receiving a video playback request from a passenger associated with a particular display device, the controller may determine a display resolution at which the requested video should be sent. To fulfil the request, the controller may look up the first manifest file to determine how much bandwidth is physically available for carrying the requested video from the media server to the display device. For example, the controller may determine that B bits/second bandwidth is physically possible. The controller may then determine what is the best display resolution possible for the available bandwidth. For example, the controller may determine that best available and possible resolution for the particular bandwidth is R1 (e.g., standard definition or high definition, or 4K, and so on). The controller may then determine whether the requesting display is able to handle the best possible resolution R1. If all of the conditions are possible, then then a connection is established for the requested video playback using RI resolution and B bits/second bitrate. If any prong of the three-part test (physical bandwidth, available resolutions and display capability) provides a negative answer, then the controller may look for a closest possible resolution or bitrate that will allow sending the requested video to the display device.

It is noted that the final actual bitrate used for streaming the requested video may further depend on additional criteria such as passenger profile. The above-described decision tree may be implemented using a rule-based decision process in which multiple prongs are simultaneously or sequentially evaluated to determine the display resolution at which a requested media will be sent.

9. Modifying Connectivity Mid-Session

In some cases, the controller may need to modify operational parameters of a video streaming connections while video streaming is ongoing. One reason may be that a passenger having a higher priority has requested a video, which requires taking away some bandwidth from a passenger having a lower priority. In such a case, display resolution of the video may be changed to a lower resolution for the ongoing connection in order to free up bandwidth.

Conversely, in some cases, the display resolution of an ongoing connection may be increased upon some bandwidth becoming available because another passenger stopped watching video. To facilitate such as re-use of bandwidth between a first display device (D1) and a second display device (D2), the controller may determine whether D1 and D2 share any network resources. If D1 and D2 do not share any network resources (e.g., as indicated by the network map in the first manifest file), then rebalancing of resources may be omitted. If it is determined that D1 and D2 share network resources, then the mid-stream modification to rebalance network resources may be performed subject to whether passenger profiles associated with displays D1 and D2 warrant such a change.

10. Embodiments about Seamless User Experience Across Different Service Areas In some embodiments, the adaptive video on demand technique may be extended beyond video offering within one airplane's IFEC. For example, a passenger profile may identify a passenger while the passenger is moving through one travel segment, at the airport or in an airlines lounge and into a next travel segment (which may be with another airlines). Based on connectivity with a ground server, the controller in a current flight (or location) of the passenger may be able to determine how the passenger was provided with video (specifically, display resolution and quality) prior to the current video streaming and may attempt to provide a seamless user experience by continuing ongoing video streaming session at a same resolution as before.

To enable such a seamless user experience, after a flight segment is over or when a passenger pauses her video session, the controller may report this information, which includes passenger identification and a current display setting, to the ground server. When the ground server receives a query from another controller for a continuation of video viewing by the passenger, the ground server may provide the display settings to the another controller such that the another controller is able to provide a seamless user experience.

11. Examples of Technical Solutions

The following technical solutions may be adopted by some preferred embodiments.

1. A method of managing an in-flight digital communication network (e.g., method described with reference to FIG. 5), comprising: receiving a first manifest file indicative of a bandwidth map of a wired in-flight digital communication network in an airplane and a capability map of display devices coupled to the wired in-flight digital communication network; receiving a second manifest file indicative of a profile map of passengers in the airplane; establishing a first data connectivity between a first group of display devices and a media data server in the airplane according to the bandwidth map and the profile map, wherein the first group of display devices are provided media at a first display resolution; establishing a second data connectivity between a second group of display devices and the media data server in the airplane according to the bandwidth map and the profile map, wherein the second group of display devices are provided media data at a second display resolution different than the first display resolution; and wherein the first display resolution and the second display resolution are a function of the bandwidth map, the profile map, a current number of devices in the first group of display devices and a current number of devices in the second group of display devices.

2. The method of solution 1, wherein the second manifest file is received from a ground server in anticipation of a start of a travel segment.

3. The method of solution 1, wherein the first group of display devices and the second group of display devices are separately grouped according to a location within the airplane.

4. The method of solution 1, wherein the first group of display devices and the second group of display devices are grouped according to a profile of a passenger associated with cach display device.

5. The method of solution 1, receiving a third manifest file indicative of passenger airport terminal or gate Wi-fi usage and levels of data connectivity between a passenger of the first group or the second group of the data media server of the airplane.

6. The method of solution 5, wherein according to the first manifest file, the passenger is connected to a media to continue watching the media at an airport lounge at a level of the data connectivity prescribed by the first manifest file.

7. The method of solution 1, further including: transmitting information related to the first data connectivity or the second data connectivity to a ground server.

8. The method of solution 1, further including: overriding, for a particular display device in the first group of display device, a setting in the bandwidth map or the profile map, based on an input received at a user interface of the particular display device.

9. A method of processing media requests, comprising: receiving, from a display device in an airplane, a media request over a wired in-flight data network; accessing, due to the receiving the media request, a first manifest file indicative of a bandwidth map of the wired in-flight network and a second manifest file indicative of a profile map of passengers in the airplane; determining, according to a predetermined rule based on the first manifest file and the second manifest file, a display resolution for satisfying the media request; and providing requested media to the display device according to the determining.

10. The method of solution 9, wherein the requested media is provided after altering ongoing media request fulfillment for at least one other display device.

11. The method of solution 9, receiving a third manifest file indicative of passenger airport terminal or gate Wi-fi usage and levels of data connectivity between a passenger of a first group or a second group of display devices the airplane.

12. The method of solution 11, wherein according to the first manifest file, the passenger is connected to a media to continue watching the media at an airport lounge at a level of the data connectivity prescribed by the first manifest file.

13. An apparatus (e.g., apparatus 200 disclosed with reference to FIG. 2) comprising at least one processor configured to read instructions stored in a memory and implement a method for managing an in-flight digital communication network, the method comprising: receiving a first manifest file indicative of a bandwidth map of a wired in-flight digital communication network in an airplane and a capability map of display devices coupled to the wired in-flight digital communication network; receiving a second manifest file indicative of a profile map of passengers in the airplane; establishing a first data connectivity between a first group of display devices and a media data server in the airplane according to the bandwidth map and the profile map, wherein the first group of display devices are provided media at a first display resolution; establishing a second data connectivity between a second group of display devices and the media data server in the airplane according to the bandwidth map and the profile map, wherein the second group of display devices are provided media data at a second display resolution different than the first display resolution; and wherein the first display resolution and the second display resolution are a function of the bandwidth map, the profile map, a current number of devices in the first group of display devices and a current number of devices in the second group of display devices.

14. The apparatus of solution 13, wherein the second manifest file is received from a ground server in anticipation of a start of a travel segment.

15. The apparatus of solution 13, wherein the first group of display devices and the second group of display devices are separately grouped according to a location within the airplane.

16. The apparatus of solution 13, wherein the first group of display devices and the second group of display devices are grouped according to a profile of a passenger associated with cach display device.

17. The apparatus of solution 13, receiving a third manifest file indicative of passenger airport terminal or gate Wi-fi usage and levels of data connectivity between a passenger of the first group or the second group of the data media server of the airplane.

18. The apparatus of solution 17, wherein according to the first manifest file, the passenger is connected to a media to continue watching the media at an airport lounge at a level of the data connectivity prescribed by the first manifest file.

19. The apparatus of solution 13, wherein the method further includes: transmitting information related to the first data connectivity or the second data connectivity to a ground server.

20. The apparatus of solution 13, wherein the method further includes: overriding, for a particular display device in the first group of display device, a setting in the bandwidth map or the profile map, based on an input received at a user interface of the particular display device.

With reference to the above-listed, and other technical solutions described in the present document, in some embodiments, more than two different display resolutions may be in use in an IFEC. For example, different displays with different display resolutions such as 480p/720p/1080p/4K may be simultaneously in use and may be grouped according to display size or a group of display sizes. For example, grouping may be performed according to a business rule such as "premium" resolution (4K or High definition) and a "non-premium" resolution (e.g., 480p and 720p) resolutions.

12. Concluding Remarks

It will be appreciated that in many IFE systems, the amount of bandwidth per seat is constant and equal for all seats. Using the disclosed techniques allows an IFE to dynamically determine and allocate higher bandwidth to only the seats that are requesting A VOD. Using the disclosed embodiments, IFEC systems that serve A VOD may reserve higher amounts of bandwidth specifically for premium classes (e.g., First Class/Business Class) so that they are always guaranteed the highest resolution/quality media. Even Economy Class seats could access the highest resolution media when the IFE server has bandwidth availability, as determined based on the techniques provided herein.

The disclosed techniques also lend themselves to provide a paid service for passengers: i.e., give passenger the choice, for example, the seatback Interactive user interface could prompt the passenger "Do you want to pay $5 to see this movie in 4K experience? (note: only a limited number of passengers will be able to purchase this feature, buy now.)" If the passenger selects yes, the controller would reserve the bandwidth needed for 4K media for that seat only. The IFE server would calculate the number of seats that could buy this service based on the IFE server's bandwidth capacity, and once the maximum number of passengers purchase this service, then the server would disallow additional seats to purchase access so that there is no possibility over-subscription.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer-or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The various embodiments introduced herein can be implemented by, for example, programmable circuitry (e.g., one or more microprocessors, programmed with software and/or firmware), or entirely in special-purpose hardwired circuitry (e.g., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc. In some embodiments, the methods may be stored in the form of computer-executable instructions that are stored on a computer-readable medium. Alternatively, or in addition, cloud-based computing resources may be used for implementing the embodiments.

The embodiments set forth herein represent the necessary information to enable those skilled in the art to practice the embodiments and illustrate the best mode of practicing the embodiments. Upon reading the description in light of the accompanying figures, those skilled in the art will understand the concepts of the disclosure and will recognize applications of these concepts that are not particularly addressed herein. These concepts and applications fall within the scope of the disclosure and the accompanying claims.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method of managing an in-flight digital communication network, comprising:

receiving a first manifest file indicative of a bandwidth map of a wired in-flight digital communication network in an airplane and a capability map of display devices coupled to the wired in-flight digital communication network;

receiving a second manifest file indicative of a profile map of passengers in the airplane;

establishing a first data connectivity between a first group of display devices and a media data server in the airplane according to the bandwidth map and the profile map, wherein the first group of display devices are provided media at a first display resolution;

establishing a second data connectivity between a second group of display devices and the media data server in the airplane according to the bandwidth map and the profile map, wherein the second group of display devices are provided media data at a second display resolution different than the first display resolution; and wherein the first display resolution and the second display resolution are a function of the bandwidth map, the profile map, a current number of devices in the first group of display devices and a current number of devices in the second group of display devices.

2. The method of claim 1, wherein the second manifest file is received from a ground server in anticipation of a start of a travel segment.

3. The method of claim 1, wherein the first group of display devices and the second group of display devices are separately grouped according to a location within the airplane.

4. The method of claim 1, wherein the first group of display devices and the second group of display devices are grouped according to a profile of a passenger associated with each display device.

5. The method of claim 1, receiving a third manifest file indicative of passenger airport terminal or gate Wi-fi usage and levels of data connectivity between a passenger of the first group or the second group of the data media server of the airplane.

6. The method of claim 5, wherein according to the first manifest file, the passenger is connected to a media to continue watching the media at an airport lounge at a level of the data connectivity prescribed by the first manifest file.

7. The method of claim 1, further including:

transmitting information related to the first data connectivity or the second data connectivity to a ground server.

8. The method of claim 1, further including:

overriding, for a particular display device in the first group of display device, a setting in the bandwidth map or the profile map, based on an input received at a user interface of the particular display device.

9. The method of claim 1, comprising:

receiving, from a display device in the airplane, a media request over the wired in-flight digital communication network;

accessing, due to the receiving the media request, the first manifest file and the second manifest file;

determining, according to a predetermined rule based on the first manifest file and the second manifest file, a display resolution for satisfying the media request; and providing requested media to the display device according to the determining.

10. The method of claim 9, wherein the requested media is provided after altering ongoing media request fulfillment for at least one other display device.

11. The method of claim 9, receiving a third manifest file indicative of passenger airport terminal or gate Wi-fi usage and levels of data connectivity between a passenger of a first group or a second group of display devices the airplane.

12. The method of claim 11, wherein according to the first manifest file, the passenger is connected to a media to continue watching the media at an airport lounge at a level of the data connectivity prescribed by the first manifest file.

13. An apparatus comprising at least one processor configured to read instructions stored in a memory and implement a method for managing an in-flight digital communication network, the method comprising:

receiving a first manifest file indicative of a bandwidth map of a wired in-flight digital communication network in an airplane and a capability map of display devices coupled to the wired in-flight digital communication network;

receiving a second manifest file indicative of a profile map of passengers in the airplane;

establishing a first data connectivity between a first group of display devices and a media data server in the airplane according to the bandwidth map and the profile map, wherein the first group of display devices are provided media at a first display resolution;

establishing a second data connectivity between a second group of display devices and the media data server in the airplane according to the bandwidth map and the profile map, wherein the second group of display devices are provided media data at a second display resolution different than the first display resolution; and wherein the first display resolution and the second display resolution are a function of the bandwidth map, the profile map, a current number of devices in the first group of display devices and a current number of devices in the second group of display devices.

14. The apparatus of claim 13, wherein the second manifest file is received from a ground server in anticipation of a start of a travel segment.

15. The apparatus of claim 13, wherein the first group of display devices and the second group of display devices are separately grouped according to a location within the airplane.

16. The apparatus of claim 13, wherein the first group of display devices and the second group of display devices are grouped according to a profile of a passenger associated with each display device.

17. The apparatus of claim 13, receiving a third manifest file indicative of passenger airport terminal or gate Wi-fi usage and levels of data connectivity between a passenger of the first group or the second group of the data media server of the airplane.

18. The apparatus of claim 17, wherein according to the first manifest file, the passenger is connected to a media to continue watching the media at an airport lounge at a level of the data connectivity prescribed by the first manifest file.

19. The apparatus of claim 13, wherein the method further includes:

transmitting information related to the first data connectivity or the second data connectivity to a ground server.

20. The apparatus of claim 13, wherein the method further includes:

overriding, for a particular display device in the first group of display device, a setting in the bandwidth map or the profile map, based on an input received at a user interface of the particular display device.

* * * * *